US012591099B2

(12) United States Patent
Shu et al.

(10) Patent No.: US 12,591,099 B2
(45) Date of Patent: Mar. 31, 2026

(54) SPLICE TRAY AND FIBER MANAGEMENT SYSTEM

(71) Applicant: HUAWEI TECHNOLOGIES CO., LTD., Shenzhen (CN)

(72) Inventors: Siwen Shu, Shenzhen (CN); Xiupan Fan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 18/494,892

(22) Filed: Oct. 26, 2023

(65) Prior Publication Data

US 2024/0053564 A1 Feb. 15, 2024

Related U.S. Application Data

(63) Continuation of application No. PCT/CN2021/091500, filed on Apr. 30, 2021.

(51) Int. Cl.
*G02B 6/44* (2006.01)

(52) U.S. Cl.
CPC ......... *G02B 6/4454* (2013.01); *G02B 6/4455* (2013.01)

(58) Field of Classification Search
None
See application file for complete search history.

(56) References Cited

U.S. PATENT DOCUMENTS

| | | | | |
|---|---|---|---|---|
| 2010/0183274 A1* | 7/2010 | Brunet | ................. | G02B 6/4455 |
| | | | | 385/135 |
| 2013/0243386 A1* | 9/2013 | Pimentel | .............. | G02B 6/4477 |
| | | | | 385/135 |
| 2016/0238811 A1* | 8/2016 | Simmons | ........... | G02B 6/44526 |
| 2019/0086626 A1* | 3/2019 | Kubinski | ............. | G02B 6/4454 |

FOREIGN PATENT DOCUMENTS

CN 210465754 U 5/2020

* cited by examiner

*Primary Examiner* — Jerry Rahll
(74) *Attorney, Agent, or Firm* — Maier & Maier, PLLC

(57) ABSTRACT

A splice tray and a fiber management system. The splice tray includes a base tray. An optical splitting area, a splice area and a coiling storage area are formed in the tray. The splice area is for optical fiber splicing. The coiling storage area is for optical fiber coiling storage. A mounting port for mounting an optical splitter is provided in the optical splitting area. The mounting port has a first inner wall and a second inner wall facing each other. A support structure connected to the base tray is disposed between the first inner wall and the second inner wall. A weak portion is formed at a junction between the support structure and the base tray. The support structure is for adjusting a size of the mounting port along a direction from the first inner wall to the second inner wall, to fit the optical splitter.

13 Claims, 18 Drawing Sheets

<u>10</u>

301

E

301

51

51

60

61

611

60

612

613

611

60

60

SPLICE TRAY AND FIBER MANAGEMENT SYSTEM

CROSS-REFERENCE TO RELATED APPLICATIONS

This application is a continuation of International Application No. PCT/CN2021/091500, filed on Apr. 30, 2021, the disclosure of which is hereby incorporated by reference in its entirety.

TECHNICAL FIELD

The embodiments relate to the field of communication device technologies and to a splice tray and a fiber management system.

BACKGROUND

In an FTTx (fiber to the x) service, a service volume is gradually increased or adjusted when a device is deployed. Specifically, some important components or high-value parts are not fully configured in initial states. Instead, deployment is gradually increased as the service volume is increased.

In an FDT (fiber distribution terminal), there is an FMS (fiber management system). In the fiber management system, an SE (single element) and an SC (single circuit) are required. The SE is for mounting an optical splitter, and the SC is for optical fiber splicing. In addition, there is an SE for mounting components. Therefore, when deploying a splice tray, types of splice trays required by a rack on a live-network need to be investigated or all types of splice trays need to be prepared in advance, to prevent a material shortage during onsite construction. Moreover, if there are many supply sources, the types of splice trays may multiply, causing extreme inconvenience to later operation and expansion deployment.

SUMMARY

The embodiments include a splice tray and a fiber management system. The splice tray integrates functions of optical splitting, splicing, and coiling storage, can adapt to optical splitters of different sizes and specifications, and can adapt to different application scenarios without changing components.

According to a first aspect, an embodiment provides a splice tray. The splice tray may be used in a fiber management system. The splice tray can include a base tray. An optical splitting area, a splice area, and a coiling storage area are formed in the base tray based on functions. The splice area is for optical fiber splicing. The coiling storage area is for optical fiber coiling storage. A mounting port for mounting an optical splitter is provided in the optical splitting area. The mounting port has a first inner wall and a second inner wall facing each other. A support structure is disposed between the first inner wall and the second inner wall. The support structure may be connected to the first inner wall, or may be connected to the second inner wall. This is not limited. The support structure is connected to the base tray. A weak portion is formed at a junction between the support structure and the base tray. When the support structure exists in the mounting port, a space for mounting a type of optical splitter is formed between the support structure and an inner wall of the mounting port. When the support structure is removed from the mounting port from the weak portion, a space for mounting another type of optical splitter is formed between the first inner wall and the second inner wall. In other words, whether the support structure exists in the mounting port corresponds to spaces of different sizes for mounting the optical splitter. Therefore, the support structure may be for adjusting a size of the mounting port along a direction from the first inner wall to the second inner wall, to fit optical splitters of different specifications and sizes.

The splice tray integrates functions of optical splitting, splicing, and coiling storage, to facilitate component miniaturization. The splice tray can adapt to different application scenarios without changing components. In addition, the support structure is disposed in an optical splitting port, to adapt to optical splitters of different sizes and specifications in a "subtraction" manner according to different requirements, thereby achieving ease of operation and convenience in use.

The splice area is provided with a splicing module, and the splicing module includes a plurality of splicing grooves arranged in a linear array. A pair (two) of optical fibers may be correspondingly spliced in one splicing groove, and a plurality of pairs of optical fibers may be spliced at the same time in a plurality of splicing grooves. The coiling storage area is provided with a coiling storage module, and an arc surface for coiling optical fibers is formed in the coiling storage module. The arc surface can ensure bending radii of the optical fibers in a limit state.

In a possible implementation, along the direction from the first inner wall to the second inner wall, the support structure includes at least one support plate sequentially connected, and a weak portion is formed at a junction between any two support plates. A size of each support plate from the mounting port is different. Therefore, each support plate equivalently corresponds to at least one type of space for mounting the optical splitter. During use, the support plate is removed from the weak portion according to the requirements, to adapt to the optical splitters of different sizes and specifications.

According to a second aspect, based on the structure of the foregoing splice tray, the embodiments further provide a fiber management system. The fiber management system includes a rack and a splice tray bracket mounted on the rack. The splice tray bracket is provided with a plurality of mounting workstations. One splice tray may be correspondingly mounted at each mounting workstation. The splice trays are hinged to the corresponding mounting workstations through hinge shafts, and shaft axes of the hinge shafts are parallel to a width direction of the splice tray bracket, so that the splice trays can pivot relative to the splice tray bracket with the hinge shafts as pivot axes.

In a possible implementation, along the width direction of the splice tray bracket, the splice tray bracket has a first splice tray area and a second splice tray area. A first fiber routing bridge and a second fiber routing bridge are provided between the first splice tray area and the second splice tray area. The first fiber routing bridge is for routing optical fibers from the first splice tray area to the second splice tray area. The second fiber routing bridge is for routing optical fibers from the second splice tray area to the first splice tray area. Fiber routing directions of the optical fibers in the same fiber routing bridge are consistent, so that the routing of the optical fibers can be tidier.

In an embodiment, the first fiber routing bridge forms an arc-shaped first fiber routing channel, and the second fiber routing bridge forms an arc-shaped second fiber routing channel. Along the width direction of the splice tray bracket, a plurality of first routing paths are respectively formed on two sides of mounting workstations in the first splice tray area, and each first fiber routing path is arc-shaped. A plurality of second fiber routing paths are respectively formed on two sides of mounting workstations in the second splice tray area, and each second fiber routing path is arc-shaped. The arc-shaped channels or paths can ensure bending radii of the optical fibers in a limit state.

To ensure a bending radius of an optical fiber during transition between two adjacent structures, a connection channel between the first fiber routing path and the first fiber routing channel is arc-shaped, and a connection channel between the first fiber routing path and the second fiber routing channel is arc-shaped. In addition, a connection channel between the second fiber routing path and the first fiber routing channel is arc-shaped, and a connection channel between the second fiber routing path and the second fiber routing channel is arc-shaped.

In a possible implementation, a plurality of fiber routing structures and a plurality of first optical fiber fixing structures are provided on the rack. The fiber routing structures are in a one-to-one correspondence with the first optical fiber fixing structures. The fiber routing structure is for routing optical fibers. The first optical fiber fixing structure is for correspondingly fixing the optical fibers. Along the width direction of the splice tray bracket, each fiber routing structure forms a plurality of first optical fiber channels, for leading optical fibers into the splice tray bracket or leading optical fibers out from the splice tray bracket. Each first optical fiber channel can accommodate at least one optical fiber. A first elastic fitting member is disposed between each group of the fiber routing structure and the first optical fiber fixing structure that correspond to each other, and the first elastic fitting member nests the first optical fiber channel to adapt to the optical fiber. The first elastic fitting member may be made of a rubber material. When the first optical fiber fixing structure locks the optical fibers in the first optical fiber channel, the first elastic fitting member may compress the optical fibers to limit the optical fiber without causing damage to the optical fibers.

In a group of the first optical fiber fixing structure and the fiber routing structure that correspond to each other, along an arrangement direction of the plurality of first optical fiber channels, a first fixing position is provided on one side of the fiber routing structure, and a first locking position is provided on the other side of the fiber routing structure; and one end of the first optical fiber fixing structure is hinged to the first fixing position, a first locking portion is formed at the other end of the first optical fiber fixing structure, and the first optical fiber fixing structure is pivotable about a hinge point, so that the first locking portion and the first locking position fit each other to achieve locking or unlocking. Herein, the first locking position may be a protruding column, the first locking portion may be an elastic hook, and the elastic hook has a protrusion to hook the protruding column.

In a possible implementation, a plurality of second optical fiber fixing structures in a one-to-one correspondence with the fiber routing structures are included. Each second optical fiber fixing structure includes a fixing base, a fixing member, and a second elastic fitting member. The fixing base is fixed to the rack, a plurality of second optical fiber channels are formed on the fixing base, and the second elastic fitting member nests the plurality of second optical fiber channels. Along an arrangement direction of the plurality of second optical fiber channels, the fixing base is provided with a second fixing position on one side of the plurality of second optical fiber channels, and is provided with a second locking position on the other side of the plurality of second optical fiber channels. One end of the fixing member is hinged to the second fixing position, a second locking portion is formed at the other end of the fixing member, and the fixing member is pivotable about the hinge point, so that the second locking portion and second locking position fit each other to achieve locking or unlocking. Herein the second locking position may be a protruding column, the second locking portion is an elastic hook, and the elastic hook has a protrusion to hook the protruding column.

BRIEF DESCRIPTION OF DRAWINGS

FIG. 10a is an enlarged view of part F in FIG. 9a;

FIG. 16*a* is a schematic diagram of a structure of another fiber routing base plate in a fiber management system according to an embodiment;

DETAILED DESCRIPTION OF EMBODIMENTS

A splice tray in a fiber management system is for protective connection and optical fiber distribution between two or more optical fibers may be shown and described. A splice tray box in the conventional technology is only applicable to connection of one type of optical fiber. In this case, a plurality of types of splice trays need to be prepared during use of the fiber management system to adapt to different application scenarios. This causes extreme inconvenience to later operation and expansion deployment of optical application services.

Therefore, embodiments provide a splice tray and a fiber management system to adapt to different application scenarios without replacing components.

To make the objectives, solutions, and advantages of the embodiments clearer, the following further describes the embodiments in detail with reference to the accompanying drawings.

Terms used in the following embodiments are merely intended to describe specific embodiments, and are not intended as limiting. The singular expressions "a/an", "one", "the foregoing", "the above", "the" and "this" are intended to also include such expressions as "one or more", unless otherwise clearly indicated in the context.

Reference to "an embodiment" or "some embodiments" or the like means that one or more embodiments include a specific feature, structure, or characteristic described with reference to this embodiment. Therefore, statements "in one embodiment", "in some embodiments", "in other embodiments", "in some other embodiments" and the like do not necessarily refer to the same embodiment, but rather means "one or more but not all embodiments", unless otherwise specified. Terms "includes", "comprises", "have", and variations thereof all mean "including, but not limited to", unless otherwise specified.

Figure 1:
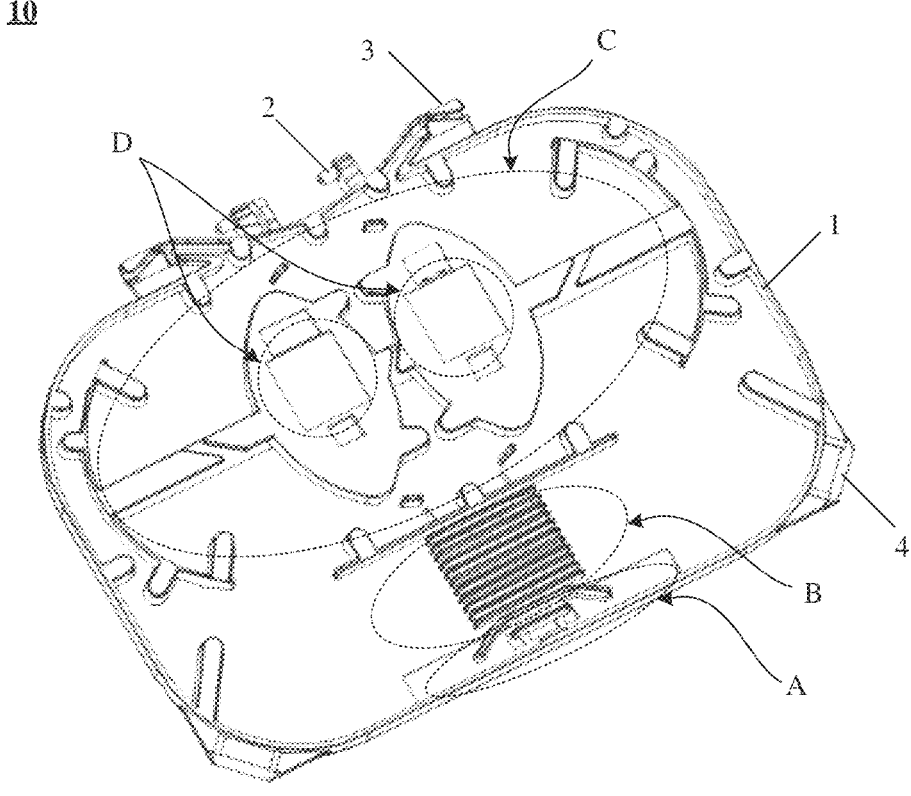
FIG. 1 is a structure of a splice tray according to an embodiment.

FIG. 1 refers to a structure of a splice tray 10 provided in an embodiment. The splice tray 10 includes a base tray 1. During use, the splice tray 10 can be mounted on another structure. Therefore, a mounting shaft 2 is provided at an edge of the base tray 1. The mounting shaft 2 may pivotably cooperate with holes of other structures to hinge the splice tray 10 to the other structures. To ensure stability of structural mounting, two mounting shafts 2 are disposed, and the two mounting shafts 2 are in a same direction, so that the two mounting shafts 2 can penetrate through the holes of other structures from one direction. Fiber inlets 3 are further provided on the base tray 1. In FIG. 1, the fiber inlets 3 are formed into a tubular shape by winding a flat plate integrated with the base tray 1. Two fiber inlets 3 are disposed, to provide two directions for optical fibers to enter the splice tray 10. A shaft axis direction of the tubular fiber inlet 3 is collinear with a shaft axis direction of the mounting shaft 2. After optical fibers enter the splice tray 10 from the fiber inlet 3, pivoting of the splice tray 10 relative to other structures does not cause pulling of the optical fibers. To number the splice tray 10, a number ring fixing portion 4 is further formed at the edge of the base tray 1. It can be understood from FIG. 1 that the mounting shaft 2 and the fiber inlets 3 are provided on a same side of the splice tray 10, that is, a side of the splice tray 10 for mounting, thereby facilitating management and storage of optical fibers. The number ring fixing part 4 is provided away from the side of the splice tray 10 for mounting, thereby facilitating sorting and identification.

In FIG. 1, the base tray 1 forms an optical splitting area A, a splice area B, and a coiling storage area C based on functions. The optical splitting area A is for mounting an optical splitter to split optical signals. The splice area B is for optical fiber splicing. The coiling storage area C is for optical fiber coiling storage. Optical fiber splicing, distribution, and optical splitting are integrated into one base tray 1, so that the splice tray 10 has a splicing function, an optical splitting function, and a distribution function. The structure of the splice tray 10 is compact and convenient. During use, different functions can be selected according to different scenarios without replacing components. In addition, for convenience in use, label attachment areas D are also formed on the base tray 1.

Figure 2:
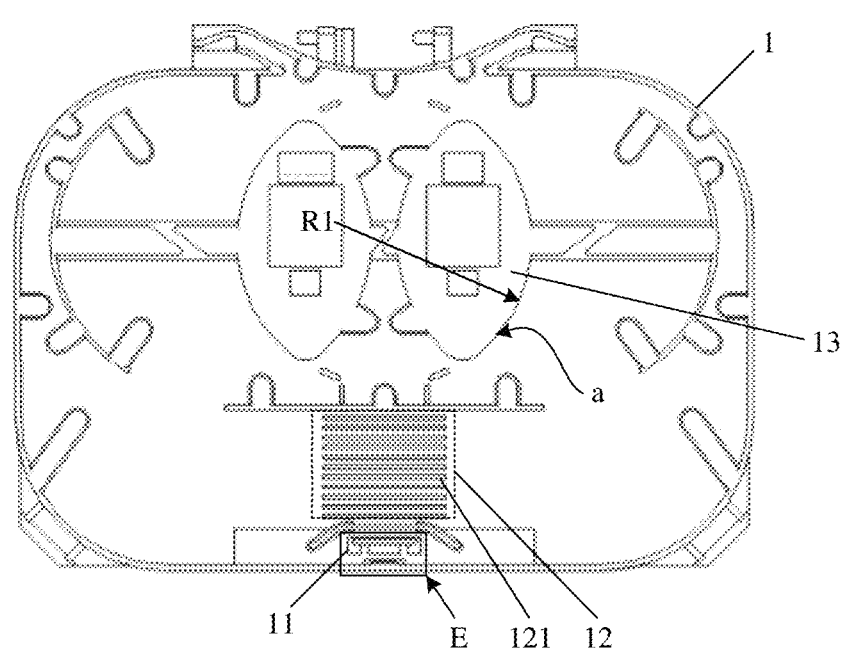
FIG. 2 is a front view of a splice tray according to an embodiment.

In a front view of a splice tray 10 shown in FIG. 2, a mounting port 11 is provided in the optical splitting area A, and is for mounting an optical splitter to split an optical signal. A splicing module 12 is provided in the splice area B. The splicing module 12 forms a plurality of splicing grooves 121 in a linear array. A pair of optical fibers that need to be spliced are correspondingly spliced in each splicing groove 121. The splicing module 12 may implement optical fiber splicing in a plurality of scenarios according to requirements, for example, 4-core splicing in a P2P (point to point) scenario, and 12-core splicing in a P2MP (point to multiple point) scenario. Two coiling storage modules 13 are symmetrically provided in the coiling storage area C. The coiling storage modules 13 are of a spindle-like type, and have an arc surface a for coiling the optical fibers, thereby facilitating arrangement of the optical fibers. The radius of the arc surface a herein needs to be ensured to meet a minimum radius of coiling and bending of the optical fibers. For example, a radius R1 of the arc surface a may be set to 30 mm.

Figure 3A:
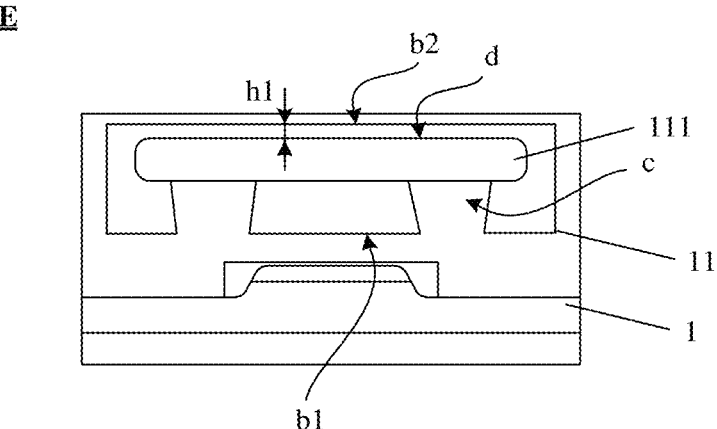
FIG. 3a is a schematic diagram of a structure of a mounting port in a splice tray according to an embodiment.

FIG. 3*a* provides a structure of the mounting port 11, including an enlarged view of part E in FIG. 2. The mounting port 11 has a first inner wall b1 and a second inner wall b2 facing each other. A support structure 111 is disposed in the mounting port 11. The support structure 111 is connected to the first inner wall b1. A weak portion c is formed at a junction between the support structure 111 and the base tray 1. Additionally, the support structure 111 may also be connected to the second inner wall b2. In FIG. 3*a*, the support structure 111 extends from the first inner wall b1 to the second inner wall b2, and a space (a gap shown by h1 in FIG. 3a) between a free end (a plane shown by d in FIG. 3a) of the support structure 111 and the second inner wall b2 may be for mounting the optical splitter. A gap formed between the free end of the support structure 111 and the second inner wall b2 corresponds to a size of the optical splitter. If the support structure 111 is separated from the base tray 1 at a weak portion, the structure of the mounting port 11 may be shown in FIG. 3b. A space between the first inner wall b1 and the second inner wall b2 (a gap shown by h2 in FIG. 3b) may be for mounting an optical splitter of another size.

Figure 3B:
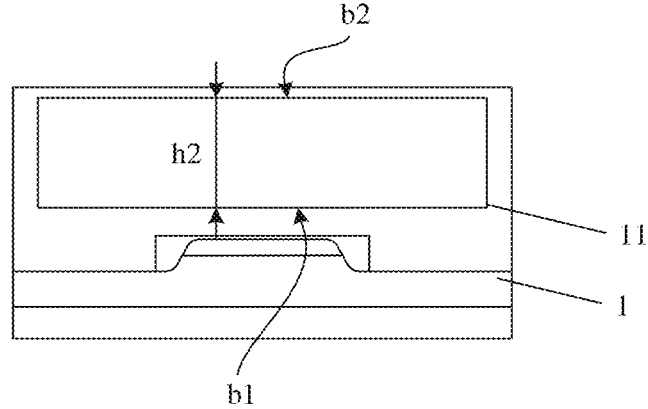
FIG. 3b is a schematic diagram of a structure of a mounting port in a splice tray according to an embodiment.

Therefore, the support structure 111 may adjust a size of the mounting port 11 in a direction from the first inner wall b1 to the second inner wall b2, and the size is for cooperating to mount the optical splitter. During use, FIG. 3a shows an initial state of a structure of the mounting port 11 of the splice tray 10, and an optical splitter of a smaller size may be mounted on the splice tray 10. When the support structure 111 is removed, a state of the mounting port 11 of the splice tray 10 is shown in FIG. 3b. The mounting port 11 may be for mounting another optical splitter of a larger size. In a process of adapting to optical splitters of different sizes (a smaller size is changed to a larger size), only the support structure 111 needs to be removed in a "subtraction" manner without replacing components. This is simple and convenient.

Figure 3C:
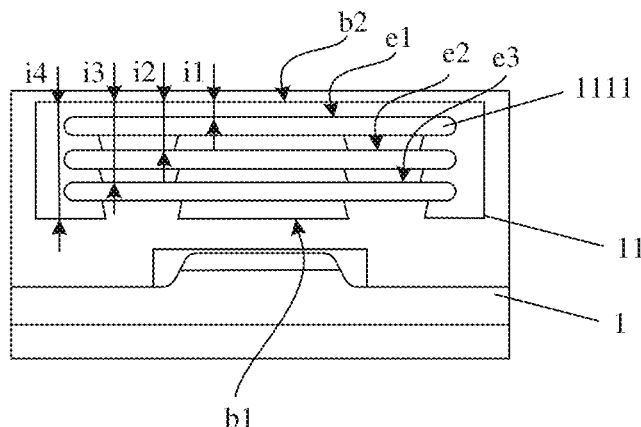
FIG. 3c is a schematic diagram of a structure of a mounting port in a splice tray according to an embodiment.

Based on the foregoing idea, to adapt to optical splitters of more different sizes, the structure of the mounting port 11 may alternatively be shown in FIG. 3c. The support structure 111 includes at least one support plate 1111, and the weak portion is formed between every two adjacent support plates 1111. When there is one support plate 1111, the structure of the mounting port 11 is similar to that shown in FIG. 3a. FIG. 3c shows the support structure 111 with three support plates 1111. In a direction from the second inner wall b2 to the first inner wall b1, the three support plates 1111 are arranged in a linear array. In the direction from the second inner wall b2 to the first inner wall b1, a space (a gap shown by it in FIG. 3c) between a first support plate 1111 and the second inner wall b2 corresponds to an optical splitter of a size; a space (a gap shown by i2 in FIG. 3c) between a second support plate 1111 and the second inner wall b2 corresponds to an optical splitter of a size; a space (a gap shown by i3 in FIG. 3c) between a third support plate 1111 and the second inner wall b2 corresponds to an optical splitter of a size; finally, a space (a gap shown by i4 in FIG. 3c) between the first inner wall b1 and the second inner wall b2 may be for mounting an optical splitter of another size. In other words, the mounting port 11 shown in FIG. 3c may adapt to optical splitters of four sizes according to requirements. It should be understood that the mounting port 11 shown in FIG. 3a to FIG. 3c is merely an example structure. The support structure 111 may have other structures, and the quantity of the support plates 1111 may be increased or decreased during production according to requirements to adapt to optical splitters of different sizes.

Figure 4:
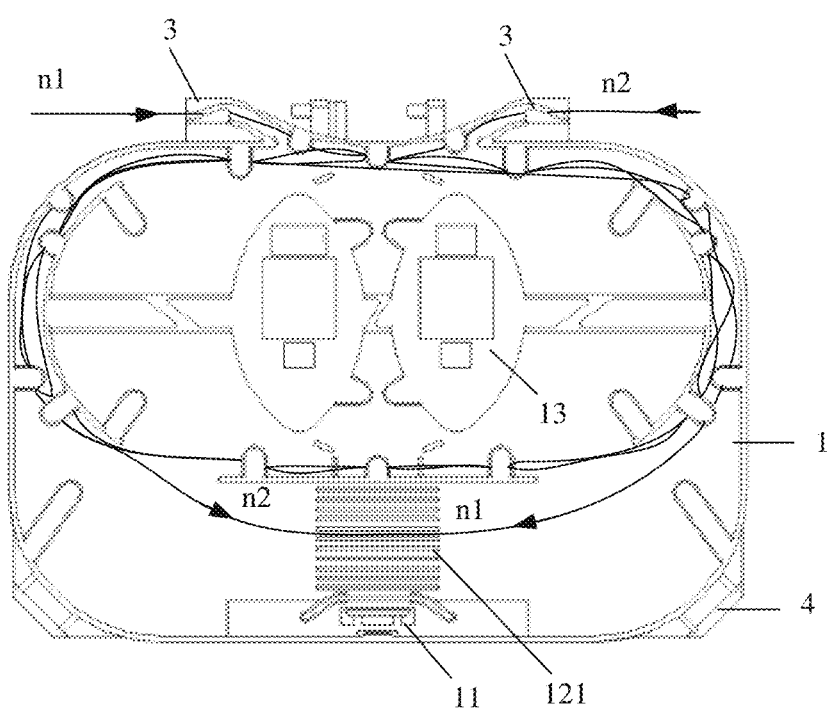
FIG. 4 is a schematic diagram of a structure of fiber routing in a splice tray according to an embodiment.
Figure 5:
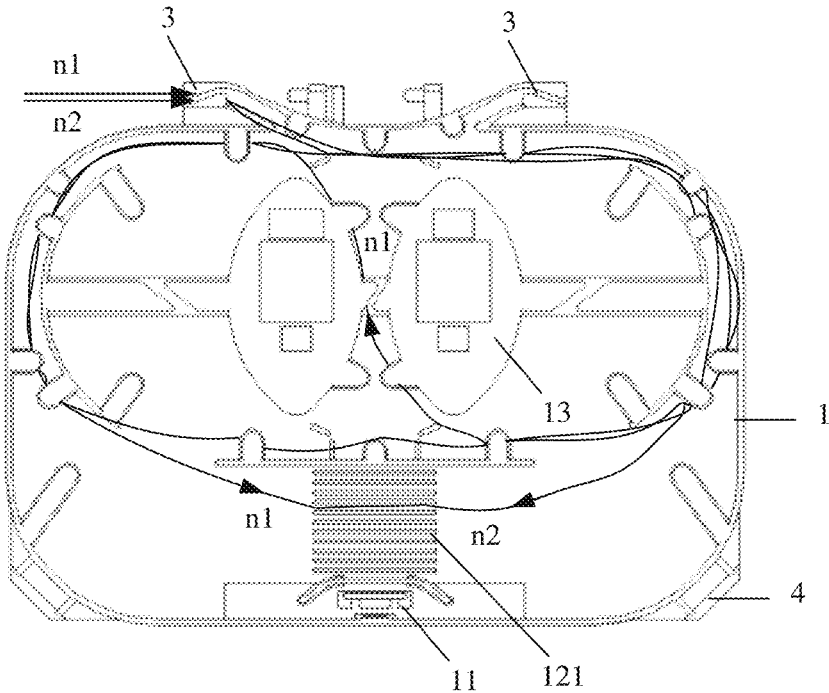
FIG. 5 is a schematic diagram of a structure of fiber routing in a splice tray according to an embodiment.

The structure of the splice tray 10 shown in FIG. 1 as an example. FIG. 4 and FIG. 5 show two optical fiber routing manners that may be implemented by the splice tray 10. In FIG. 4, two optical fibers n1 and n2 respectively enter the splice tray 10 through two fiber inlets 3. A routing direction of the optical fiber n1 is clockwise, and a routing direction of the optical fiber n2 is counterclockwise. The two optical fibers are spliced in the splicing grooves 121 after being wound at the outside of a coiling area C of the base tray 1. In FIG. 5, two optical fibers n1 and n2 enter the splice tray 10 through a same fiber inlet 3 (the fiber inlet 3 on the left in FIG. 5). The two optical fibers n1 and n2 enter the splice tray 10 in a clockwise direction. After entering the splice tray 10, the optical fiber n1 is wound clockwise first, and then the routing direction is changed to counterclockwise after the optical fiber n1 passes through a gap between the two coiling storage modules 13. The optical fiber n2 is routed clockwise. Finally, the two optical fibers n1 and n2 are spliced in the splicing grooves 121. It should be understood that only two routing manners of the optical fibers in the splice tray 10 are illustrated herein. A routing manner of the optical fibers is not limited.

Figure 6:
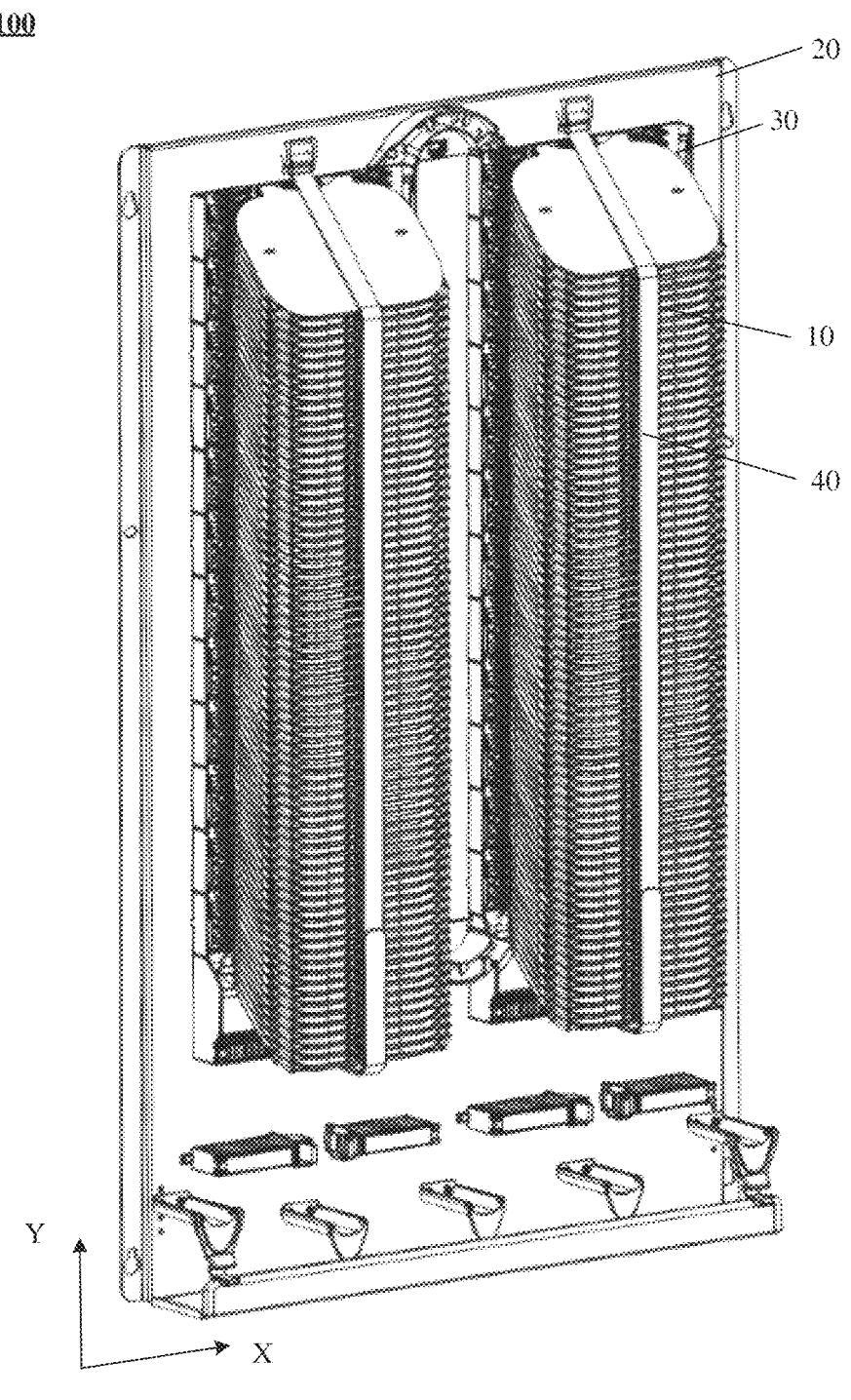
FIG. 6 is a schematic diagram of a structure of a fiber management system according to an embodiment.

On the basis of the splice tray 10, embodiments further provide a fiber management system 100. As shown in FIG. 6, the fiber management system 100 includes a rack 20. A splice tray bracket 30 is provided on the rack 20. A plurality of splice trays 10 are mounted on the splice tray bracket 30. All splice trays 10 are divided into two columns along a width direction (X direction in FIG. 6) of the splice tray bracket 30. Each column of splice trays 10 are restricted at a limit position along a height direction (Y direction in FIG. 6) of the splice tray bracket 30 through an arrangement tape 40.

Figure 7:
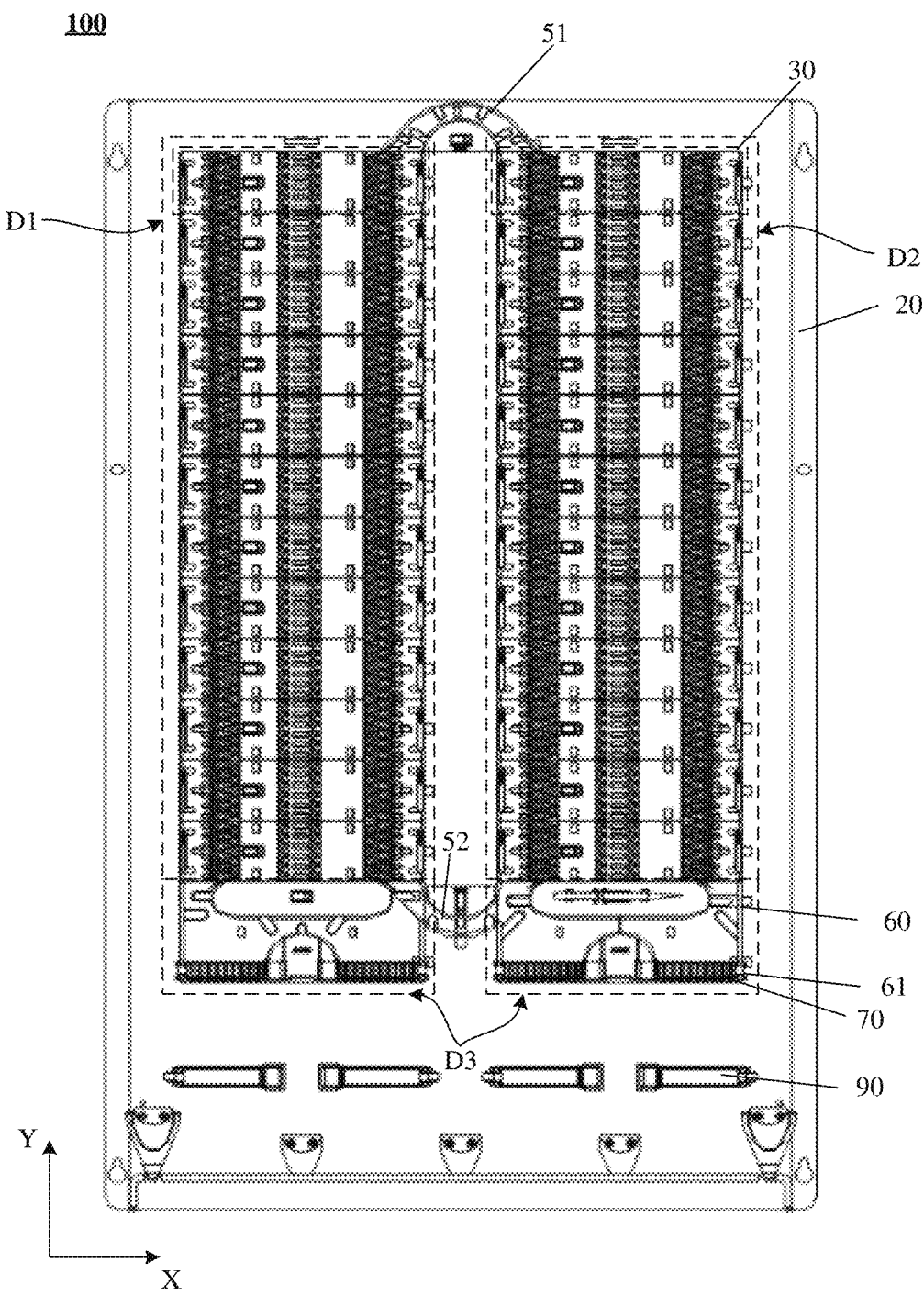
FIG. 7 is a front view of a fiber management system according to an embodiment.

FIG. 7 is a schematic diagram of a structure of the fiber management system 100 displayed after the splice tray 10 is disassembled. Along a width direction (X direction in FIG. 7) of the splice tray bracket 30, the splice tray bracket 30 is divided into a first splice tray area D1 and a second splice tray area D2. Along a height direction (Y direction in FIG. 7) of the splice tray bracket 30, a first fiber routing bridge 51 and a second fiber routing bridge 52 are provided between the first splice tray area D1 and the second splice tray area D2. In FIG. 7, the first fiber routing bridge 51 is located at the top of the first splice tray area D1 and the second splice tray area D2, and the second fiber routing bridge 52 is located at the bottom of the first splice tray area D1 and the second splice tray area D2. For example, the first fiber routing bridge 51 is for routing optical fibers from the first splice tray area D1 to the second splice tray area D2. Correspondingly, the second fiber routing bridge 52 is for routing optical fibers from the second splice tray area D2 to the first splice tray area D1. Herein, routing directions of the optical fibers in the first fiber routing bridge 51 are the same, and routing directions of the optical fibers in the second fiber routing bridge 52 are the same. It should be understood that the structure in FIG. 7 is merely an example. The positions of the first splice tray area D1 and the second splice tray area D2 may be interchangeable, and the positions of the first fiber routing bridge 51 and the second fiber routing bridge 52 may also be interchangeable. Moreover, in FIG. 7, both optical fiber routing directions of the first fiber routing bridge 51 and the second fiber routing bridge 52 are clockwise. Alternatively, optical fiber routing directions of the first fiber routing bridge 51 and the second fiber routing bridge 52 may be counterclockwise. A fiber routing area D3 for leading optical fibers in or out is further provided under the rack 20. The fiber routing area D3 is provided with a fiber routing base plate 60 corresponding to the first splice tray area D1, and is also provided with a fiber routing base plate 60 corresponding to the second splice tray area D2. Two fiber routing structures 61 are formed at each fiber routing base plate 60, and each fiber routing structure 61 is correspondingly provided with a first optical fiber fixing structure 70. Under each fiber routing structure 61, a second optical fiber fixing structure 90 is further provided on the rack 20. The second optical fiber fixing structure 90 is also in a one-to-one correspondence with the fiber routing structures 61.

Figure 8:
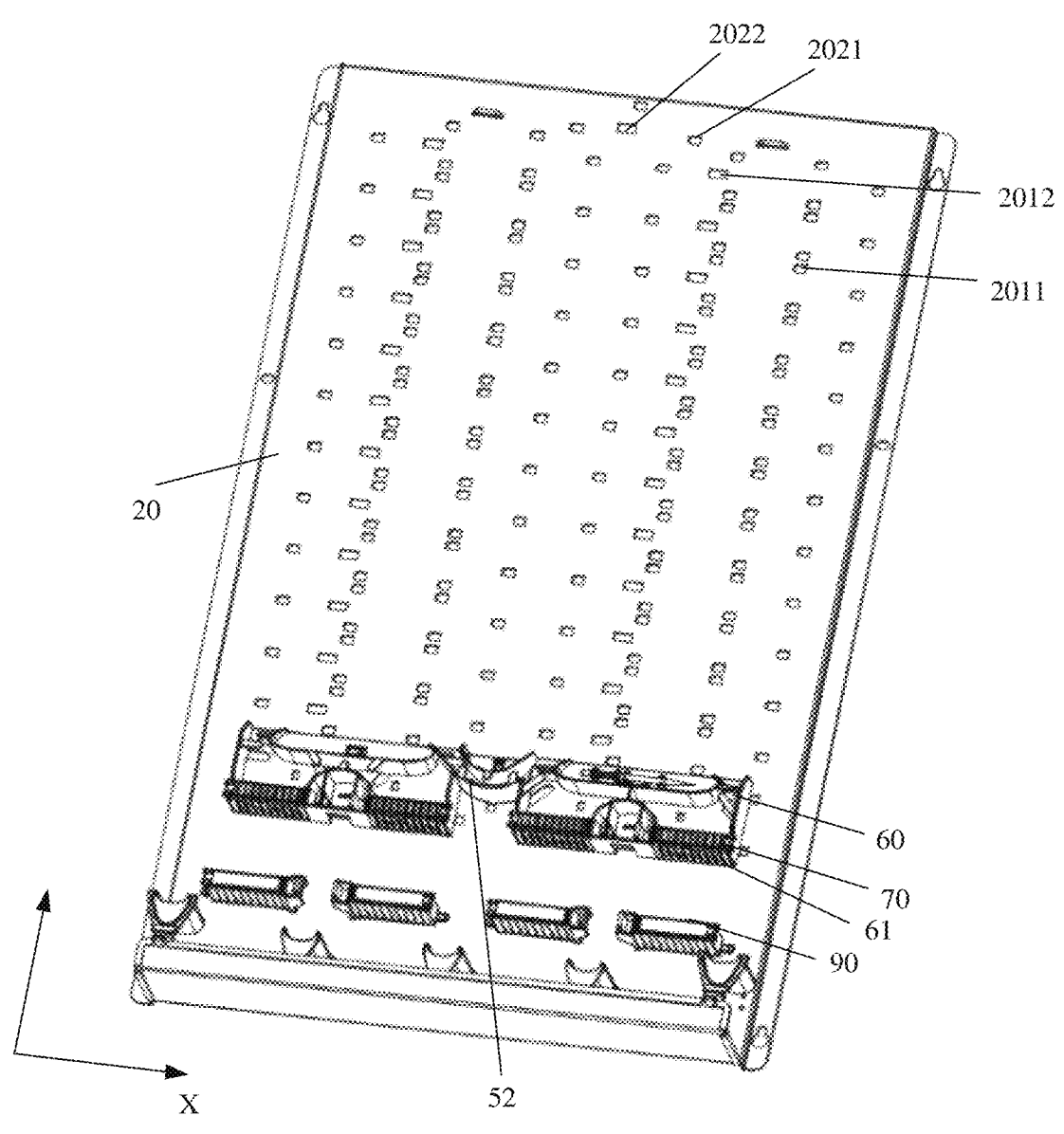
FIG. 8 is a schematic diagram of a structure of a rack in a fiber management system according to an embodiment.

A structure shown in FIG. 8 may be obtained by disassembling the first fiber routing bridge 51 and the splice tray bracket 30 from the rack 20. A first fixing hole 2011 and a first limiting hole 2012 are provided on the rack 20, for fitting and fixing the splice tray bracket 30. Along the Y direction, second fixing holes 2021 and a second limiting hole 2022 are provided on the top of the rack 20, for fitting and fixing the first fiber routing bridge 51. The second fiber routing bridge 52, the fiber routing base plates 60, and the second optical fiber fixing structures 90 are fixed on the rack 20. Therefore, structures for fixing the second fiber routing bridge 52, the fiber routing base plates 60, and the second optical fiber fixing structures 90 are not shown.

Figure 9A:
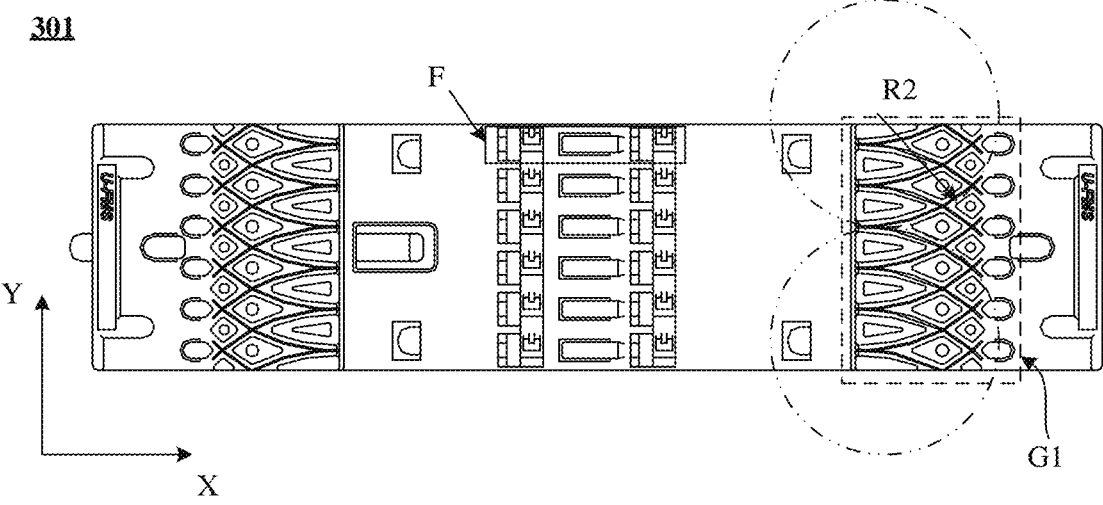
FIG. 9a is a schematic diagram of a structure of a first splicing subunit in a fiber management system according to an embodiment.
Figure 9B:
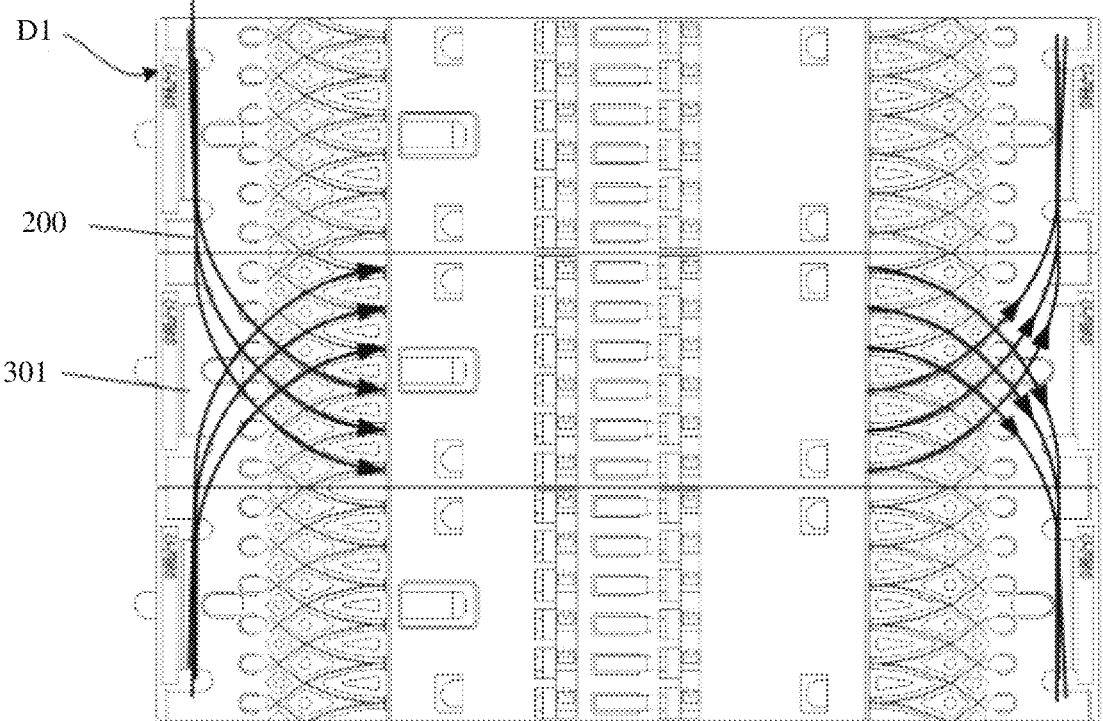
FIG. 9b is a schematic diagram of a structure of fiber routing in a plurality of first splice areas in a fiber management system according to an embodiment.

The first splice tray area D1 is used as an example. A plurality of first splice tray subunits 301 are arrayed in the first splice tray area D1 along the Y direction. FIG. 9a shows an example of a structure of one first splice tray subunit 301. In the first splice tray subunit 301, six mounting workstations for mounting the splice tray 10 in the Y direction are provided (an area shown by F in FIG. 9a). First routing areas G1 are respectively arranged on the left and right sides of the mounting workstations (along the X direction) for leading optical fibers into or out from the splice tray 10. Each first routing area G1 has a plurality of crossed first fiber routing paths, and each first fiber routing path (illustrated by arc-shaped dashed lines in FIG. 9a) is arc-shaped. To ensure minimum bending radii of the optical fibers in a limit state, a radius R2 of each first fiber routing path herein may be selected as 30 mm FIG. 9b shows a possible fiber routing manner on the splice tray bracket 30. As shown in FIG. 9b, three splice tray subunits 301 are vertically arrayed, and optical fibers 200 are led in the first splice tray subunits 301 from the first fiber routing path on the left of the first splice tray area D1, and is led out from the first fiber routing path on the right. Routing of each optical fiber has a relatively large bending angle. The first fiber routing path can well protect the optical fibers. It should be understood that a structure of the second splice tray area D2 is similar to the structure of the first splice tray area D1. Since the structure of the first splice tray area D1 is used as an example for description herein, the structure of the second splice tray area D2 is not described again.

Figure 10A:
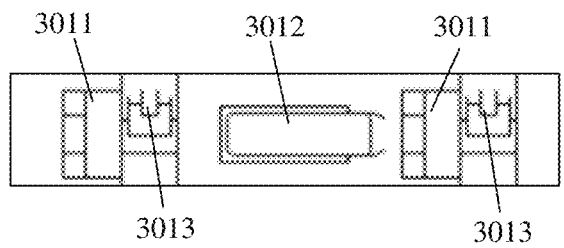
Figure 10B:
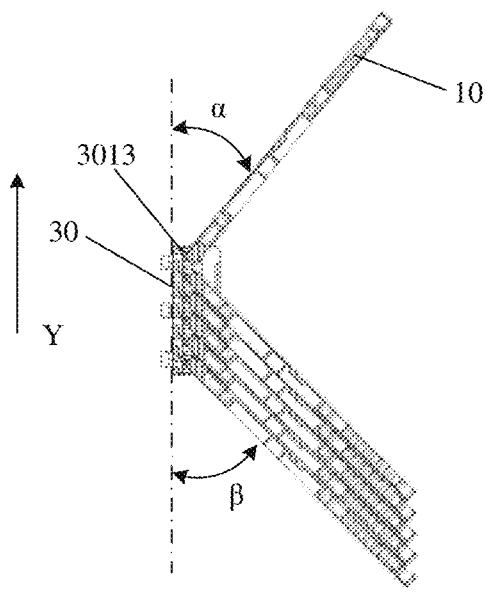
FIG. 10b is a schematic diagram of a structure of pivoting of a splice tray relative to a splice tray bracket in a fiber management system according to an embodiment.

For a structure of the mounting workstation, an enlarged view of part F in FIG. 9a may be shown in FIG. 10a. Each mounting workstation includes shaft holes 3011. The shaft holes 3011 correspond to the mounting shafts 2 of the splice tray 10 in FIG. 1. Therefore, two shaft holes 3011 are also symmetrically provided, to be hinged with the two mounting shafts 2 of the splice tray 10. To mount the splice tray 10 in cooperation with the shaft hole 3011, the mounting workstation further includes a limiting spring 3012 located between the two shaft holes 3011. When the mounting shaft 2 pivots and cooperates with the shaft hole 3011, the shaft hole 3011 may limit a circumferential direction of the mounting shaft 2, and the limiting spring 3012 may abut against the mounting shaft 2 to limit an axial direction of the mounting shaft 2, thereby mounting the splice tray 10 on the splice tray bracket 30. After the splice tray 10 is mounted through the mounting shaft 2 and the shaft hole 3011, the splice tray 10 may pivot relative to the splice tray bracket 30 by taking the mounting shaft 2 as a shaft, but pivoting needs to be limited in angle. Therefore, two angle limiting structures 3013 are further symmetrically disposed on the splice tray bracket 30. When the splice tray 10 is mounted on the splice tray bracket 30, as shown in FIG. 10b, along the Y direction, the splice tray 10 may pivot relative to the splice tray bracket 30. A limit angle α for upward turning and a limit angle β for downward turning need to exist between the splice tray 10 and the splice tray bracket 30. The limit angle α is defined by the angle limiting structures 3013. When the splice tray 10 turns upward relative to the splice tray bracket 30 until an angle between the splice tray 10 and the splice tray bracket 30 reaches the limit angle α, the angle limiting structures 3013 interfere with the splice tray 10, so that the splice tray 10 cannot continue to turn upward. Herein, the angle α may be limited to 45°. The limit angle β is defined by a next splice tray 10, and the splice trays 10 stacked layer by layer finally automatically form the limit angle β. It should be understood that, for the first splice tray 10 located at the bottom, the limit angle β of the first splice tray 10 may be limited by other structures of other fiber management systems 100. Details are not described herein again.

Figure 11:
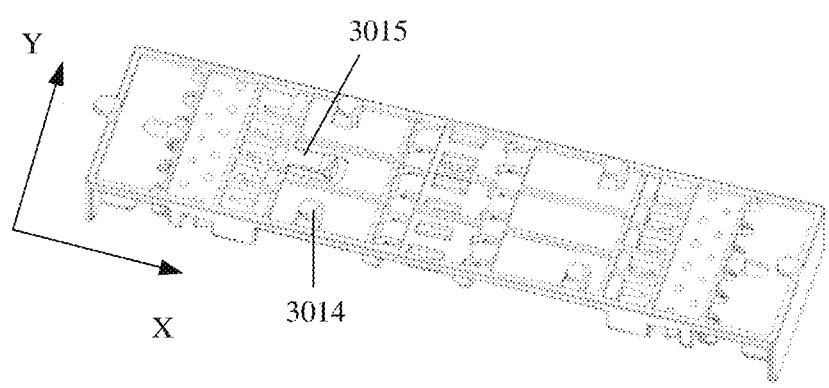
FIG. 11 is a schematic diagram of a back surface structure of a first splicing subunit in a fiber management system according to an embodiment.

For a back surface structure of the first splice tray subunit 301, refer to FIG. 11. First fixing hooks 3014 and a first locking spring 3015 are provided on the back surface of the first splice tray subunit 301. When the first splice tray subunit 301 is mounted on the rack 20, the first fixing hooks 3014 are corresponding to positions of the first fixing holes 2011 on the rack 20, and the first locking spring 3015 is corresponding to a position of the first limiting hole 2012 on the rack 20. The first fixing hooks 3014 herein are to be inserted into the first fixing holes 2011 on the rack 20 shown in FIG. 8. When the first fixing hooks 3014 are inserted into the first fixing holes 2011, the first splice tray subunits 301 may move relative to the rack 20 only along the X direction. However, the first locking spring 3015 interferes with the first limiting hole 2012, to lock the first splice tray subunits 301 to the rack 20 along the X direction, to fix the first splice tray subunits 301 and the rack 20. For stability of mounting and fixing, a plurality of first fixing hooks 3014 may be provided on each first splice tray subunit 301. FIG. 11 shows six first fixing hooks. Correspondingly, six first fixing holes 2011 corresponding to one first splice tray subunit 301 on the rack 20 are also correspondingly disposed. It should be understood that the quantities and the positions of the first fixing hooks 3014 and the first locking springs 3015 are not limited, and FIG. 11 is merely an example.

Figure 12A:
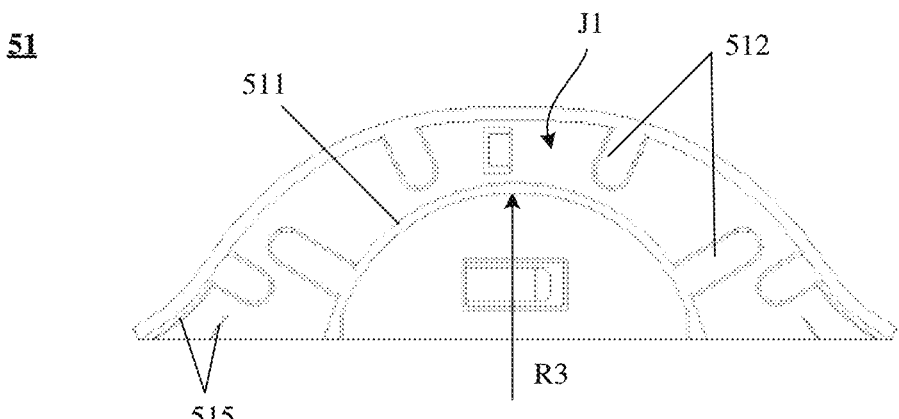
FIG. 12a and FIG. 12b are schematic diagrams of a structure of a first fiber routing bridge in a fiber management system according to an embodiment.
Figure 12B:
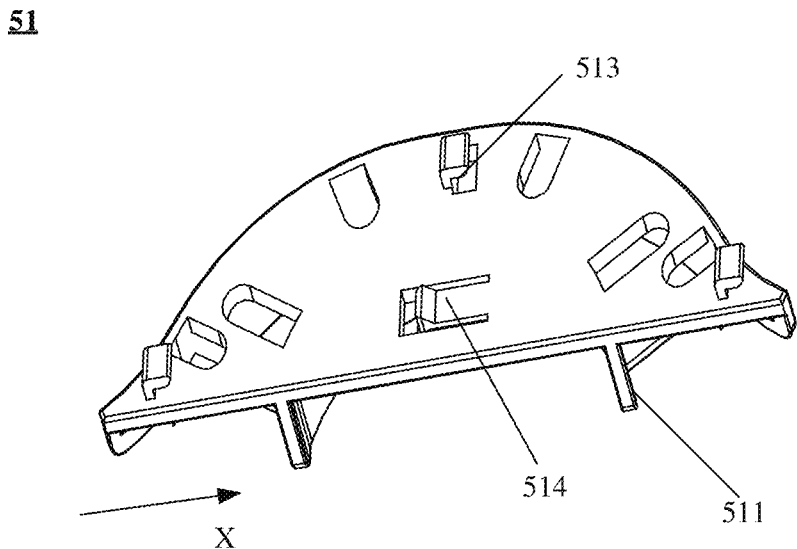

For a structure of the first fiber routing bridge 51, refer to FIG. 12a. The first fiber routing bridge 51 is provided with a first winding protrusion 511. An outer edge of the first winding protrusion 511 on the first fiber routing bridge 51 forms a first fiber routing channel J1 for routing the optical fibers. The first winding protrusion 511 is arc-shaped. To ensure minimum bending radii of the optical fibers, a radius R3 of the first winding protrusion 511 may be selected as 30 mm. To better store and arrange the optical fibers, first cable hooks 512 are further provided on two sides of a path of the first fiber routing channel J1. The first cable hooks 512 may be provided on the first winding protrusion 511, or may be provided on the outer edge of the first fiber routing bridge 51. FIG. 12b shows a back surface structure of the first fiber routing bridge 51. Second fixing hooks 513 and a second locking spring 514 are disposed on the back surface of the first fiber routing bridge 51. When the first fiber routing bridge 51 is mounted on the rack 20, the second fixing hooks 513 are corresponding to positions of the second fixing holes 2021 on the rack 20, and the second locking spring 514 is corresponding to a position of the second limiting hole 2022 on the rack 20. The second fixing hooks 513 herein are to be inserted into the second fixing holes 2021 on the rack 20 shown in FIG. 8. When the second fixing hooks 513 are inserted into the second fixing holes 2021, the first fiber routing bridge 51 may move relative to the rack 20 only along the X direction. However, the second locking spring 514 interferes with the second limiting hole 2022, to lock the first fiber routing bridge 51 to the rack 20 along the X direction, to fix the first fiber routing bridge 51 and the rack 20. For stability of mounting and fixing, a plurality of second fixing hooks 513 may be provided on each first fiber routing bridge 51. FIG. 12b shows three second fixing hooks. Correspondingly, three second fixing holes 2021 corresponding to the first fiber routing bridge 51 are also correspondingly disposed on the rack 20. It should be understood that the quantities and the positions of the second fixing hooks 513 and the second locking springs 514 are not limited, and FIG. 12b is merely an example. A guiding bar 515 is further provided on a straight side of the first fiber routing bridge 51. When the first fiber routing bridge 51 is connected to the splice tray bracket 30, the guiding bars 515 may be for guiding the optical fibers from the first fiber routing channel J1 to the splice tray bracket 30 or from the splice tray bracket 30 to the first fiber routing channel J1.

Figure 13:
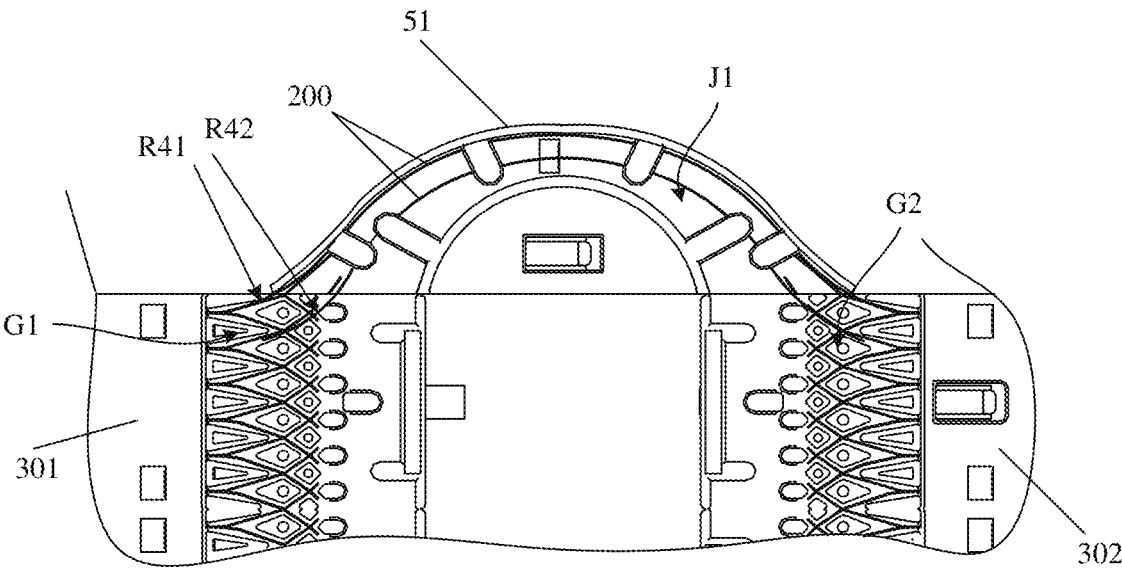
FIG. 13 is a schematic diagram of an interconnection structure between a first fiber routing bridge and a splice tray bracket in a fiber management system according to an embodiment.

The first fiber routing bridge 51 is connected to the first splice tray subunit 301 (belonging to the first splice tray area D1) and the second splice tray subunit 302 (belonging to the second splice tray area D2) to obtain a structure shown in FIG. 13. A first fiber routing path is formed in a first routing area G1 on the first splice tray subunit 301, and a second fiber routing path is formed in a second routing area G2 on the second splice tray subunit 302. A connection transition part between the first fiber routing channel J1 on the first fiber routing bridge 51 and a first fiber routing path is arc-shaped (arcs corresponding to R41 and R42 in FIG. 13). To ensure minimum bending radii of the optical fibers 200, radii of the arcs may be set to 30 mm.

Figure 14A:
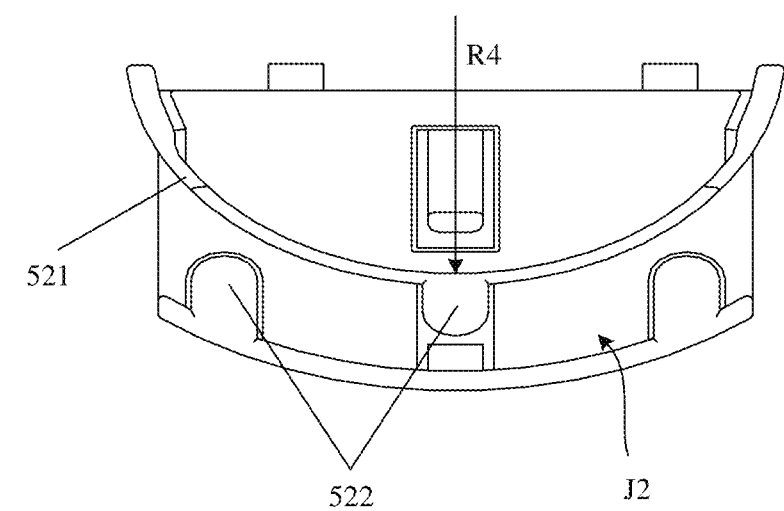
FIG. 14a is a schematic diagram of a structure of a second fiber routing bridge in a fiber management system according to an embodiment.
Figure 14B:
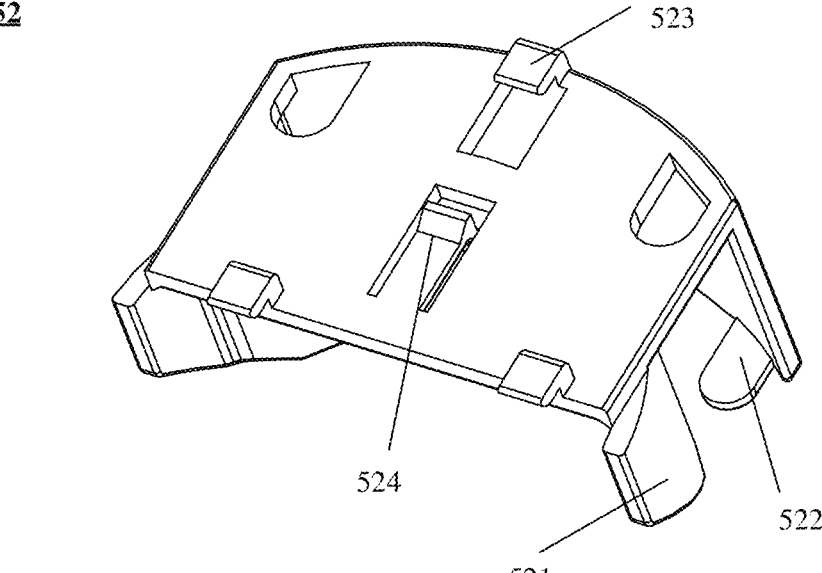
FIG. 14b is a schematic diagram of a structure of a second fiber routing bridge in a fiber management system according to an embodiment.

For a structure of the second fiber routing bridge 52, refer to FIG. 14a. The second fiber routing bridge 52 is provided with a second winding protrusion 521. An outer edge of the second winding protrusion 521 on the second fiber routing bridge 52 forms a second fiber routing channel J2 for routing the optical fibers. The second winding protrusion 521 is arc-shaped. To ensure minimum bending radii of the optical fibers, a radius R4 of the second winding protrusion 521 may be selected as 30 mm. To better store and arrange the optical fibers, second cable hooks 522 are further provided on two sides of a path of the second fiber routing channel J2. The second cable hooks 522 may be provided on the second winding protrusion 521, or may be provided on the outer edge of the second fiber routing bridge 52. FIG. 14b shows a back surface structure of the second fiber routing bridge 52. Third fixing hooks 523 and a third locking spring 524 are disposed on the back surface of the second fiber routing bridge 52. When the second fiber routing bridge 52 is mounted on the rack 20, a connection manner between the third fixing hooks 523 and the rack 20 is similar to a connection manner between the second fixing hooks 513 and the rack 20, and the third locking spring 524 and the rack 20 interfere with locking. Details are not described herein again. It should be understood that the quantities and the positions of the third fixing hooks 523 and the third locking springs 524 are not limited, and FIG. 14b is merely an example.

Figures 15A, 15B:
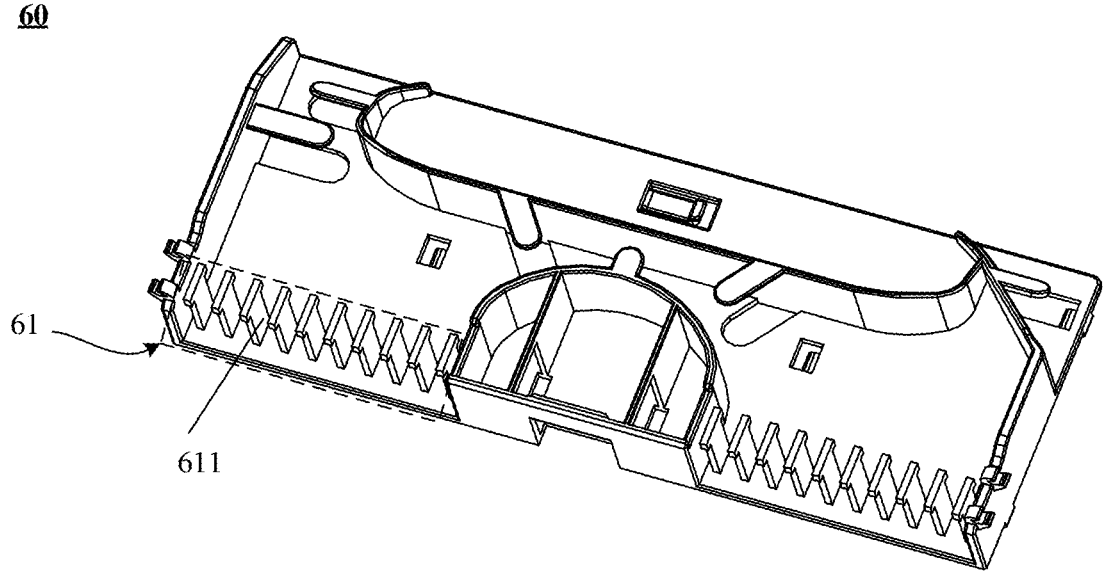
FIG. 15a is a schematic diagram of a structure of a fiber routing base plate in a fiber management system according to an embodiment.
FIG. 15b is a schematic diagram of a structure of a fiber routing base plate in a fiber management system according to an embodiment.

In FIG. 7, one fiber routing base plate 60 is disposed corresponding to the first splice tray area D1, and another fiber routing base plate 60 is also disposed corresponding to the second splice tray area D2. A fiber routing base plate 60 corresponding to the first splice tray area D1 is shown in FIG. 15a. The fiber routing base plate 60 has two fiber routing structures 61. Each fiber routing structure 61 forms a plurality of first optical fiber channels 611. The first optical fiber channels 611 are for leading optical fibers into the splice tray bracket 30 or leading optical fibers out from the splice tray bracket 30. FIG. 15b shows a schematic diagram of a back surface structure of the fiber routing base plate 60. Fourth fixing hooks 612 and a fourth locking spring 613 are provided on the back surface of a fiber routing base plate 60. When the fiber routing base plate 60 is mounted on the rack 20, a connection manner between the fourth fixing hooks 612 and the rack 20 is similar to a connection manner between the second fixing hooks 513 and the rack 20, and the fourth locking spring 613 and the rack 20 interfere with locking. Details are not described herein again. It should be understood that the quantities and the positions of the fourth fixing hooks 612 and the fourth locking springs 613 are not limited, and FIG. 15b is merely an example.

Figure 16A:
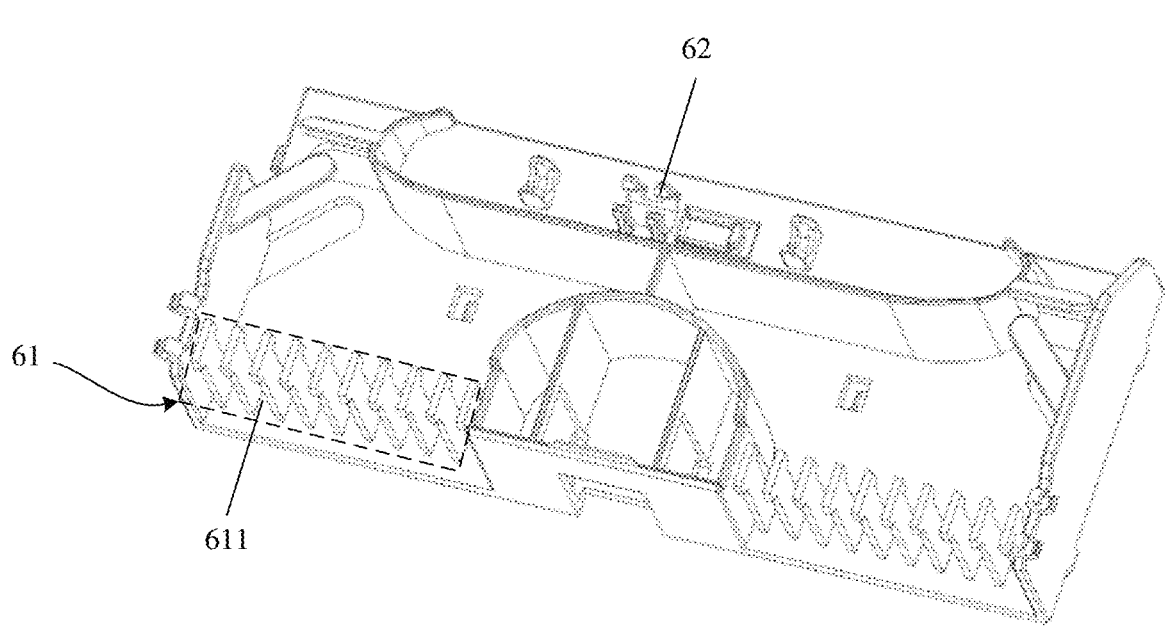
FIG. 16a is a schematic diagram of a structure of another fiber routing base plate in a fiber management system according to an embodiment.
Figure 16B:
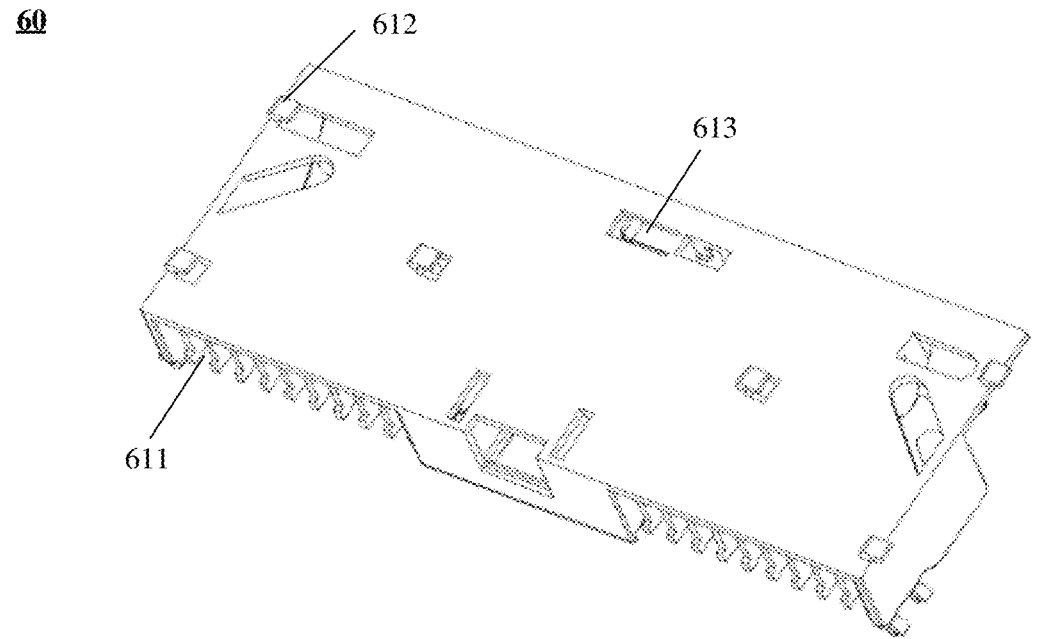

A structure of a fiber routing base plate 60b corresponding to the second splice tray area D2 is shown in FIG. 16a. The fiber routing base plate 60b has two fiber routing structures 61. Each fiber routing structure 61 forms a plurality of first optical fiber channels 611. The first optical fiber channels 611 are for leading optical fibers into the splice tray bracket 30 or leading optical fibers out from the splice tray bracket 30. A tool position 62 for accommodating tools is further provided on the fiber routing base plate 60. FIG. 16b shows a schematic diagram of a back surface structure of the fiber routing base plate 60. Fourth fixing hooks 612 and a fourth locking spring 613 are provided on the back surface of fiber routing base plate 60. When the fiber routing base plate 60 is mounted on the rack 20, a connection manner between the fourth fixing hooks 612 and the rack 20 is similar to a connection manner between the second fixing hooks 513 and the rack 20, and the fourth locking spring 613 and the rack 20 interfere with locking. Details are not described herein again. It should be understood that the quantities and the positions of the fourth fixing hooks 612 and the fourth locking springs 613 are not limited, and FIG. 16b is merely an example.

Figure 17:
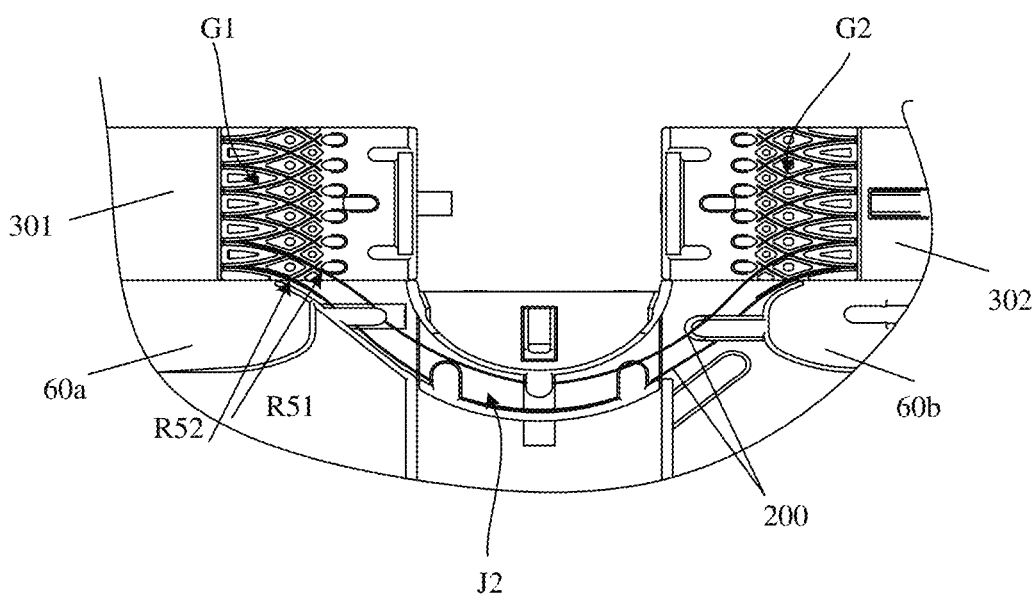
FIG. 17 is a schematic diagram of an interconnection structure between a second fiber routing bridge and a splice tray bracket in a fiber management system according to an embodiment.

The second fiber routing bridge 52 and the two fiber routing base plates 60 are connected to the first splice tray subunit 301 and the second splice tray subunit 302 to obtain a structure shown in FIG. 17. A first fiber routing path is formed in a first routing area G1 on the first splice tray subunit 301, and a second fiber routing path is formed in a second routing area G2 on the second splice tray subunit 302. The left fiber routing base plate 60 serves as a part of a fiber transition function between the first splice tray subunit 301 and the second fiber routing bridge 52. The right fiber routing base plate 60 serves as a part of a fiber transition function between the second splice tray subunit 302 and the second fiber routing bridge 52. For example, a connection transition part between the second fiber routing channel J2 on the second fiber routing bridge 52 and the first fiber routing path is arc-shaped (arcs corresponding to R51 and R52 in FIG. 20). To ensure minimum bending radii of the optical fibers, radii of the arcs may be set to 30 mm.

Figure 18:
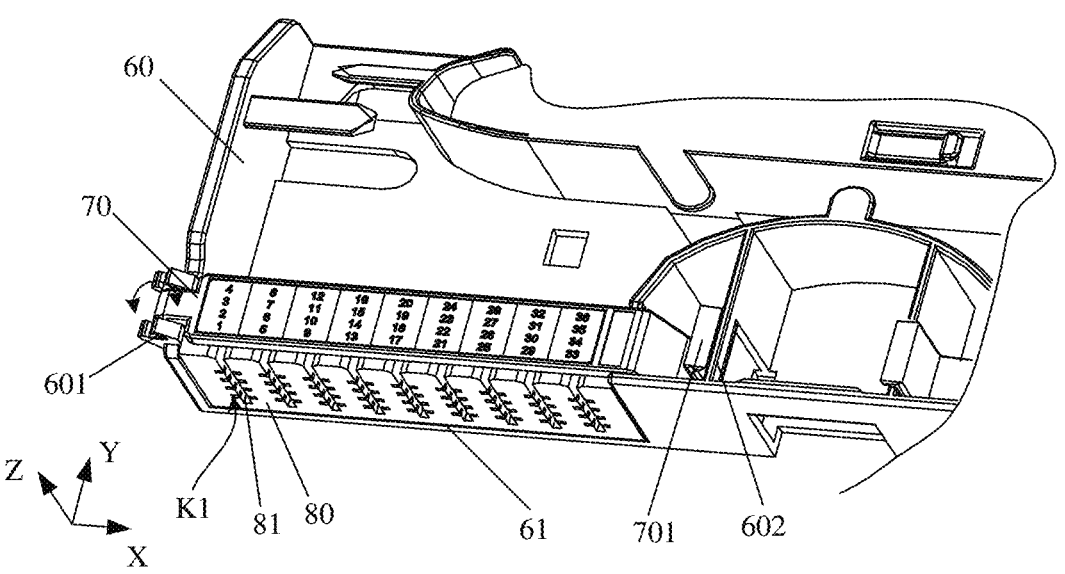
FIG. 18 is a schematic diagram of a cooperation structure between a first optical fiber fixing structure and a fiber routing structure in a fiber management system according to an embodiment.

For the first optical fiber channels 611 formed by the fiber routing structure 61, a first optical fiber fixing structure 70 is for fixing the optical fibers in the first optical fiber channels 611. As shown in FIG. 18, a first fixing position 601 is provided on one side of the fiber routing structure 61. A first locking position 602 is provided on the other side of the fiber routing structure 61 along an X direction. One end of the first optical fiber fixing structure 70 is hinged to the first fixing position 601, and a first locking portion 701 is formed at the other end of the first optical fiber fixing structure 70. In FIG. 18, the first locking portion 701 and the first locking position 602 are in a fitted locking state. The first optical fiber fixing structure 70 is pivotable about a hinge point (arrow direction shown in FIG. 18) to achieve locking or unlocking of the first locking portion 701 at the first locking position 602. To better fix the optical fibers in the first optical fiber channels 611, a first elastic fitting member 80 is disposed between the first optical fiber fixing structure 70 and the fiber routing structure 61, and the first elastic fitting member 80 nests the plurality of first optical fiber channels 611, to adapt to optical fibers of different sizes. Each first optical fiber channel 611 may adapt to at least one optical fiber. In FIG. 18, each first optical fiber channel 611 may adapt to four optical fibers. Corresponding to each first optical fiber channel 611, first slots 81 for the optical fibers to enter are formed in the first elastic fitting member 80 along the Z direction. Four adapting bayonets K1 are formed on each first slot 81 along the X direction, to adapt to optical fibers of different diameters. In the structure shown in FIG. 17, the first locking position 602 is a protruding column, the first locking portion 701 is an elastic hook, and the elastic hook has a protrusion to hook the protruding column.

The first elastic fitting member 80 herein is made of rubber. Due to good elasticity, when the optical fibers are pressed tightly, the first elastic fitting member 80 can adapt to the optical fibers of different diameters, without causing damage to the optical fibers. In FIG. 18, numbers, equivalent to optical fiber numbers, corresponding to each first optical fiber channel 611 are further marked on a surface of the first optical fiber fixing structure 70. Further, a quantity of the first optical fiber channels 611 and a quantity of the adapting bayonets K1 are optional, and are merely used as examples herein.

Figure 19A:
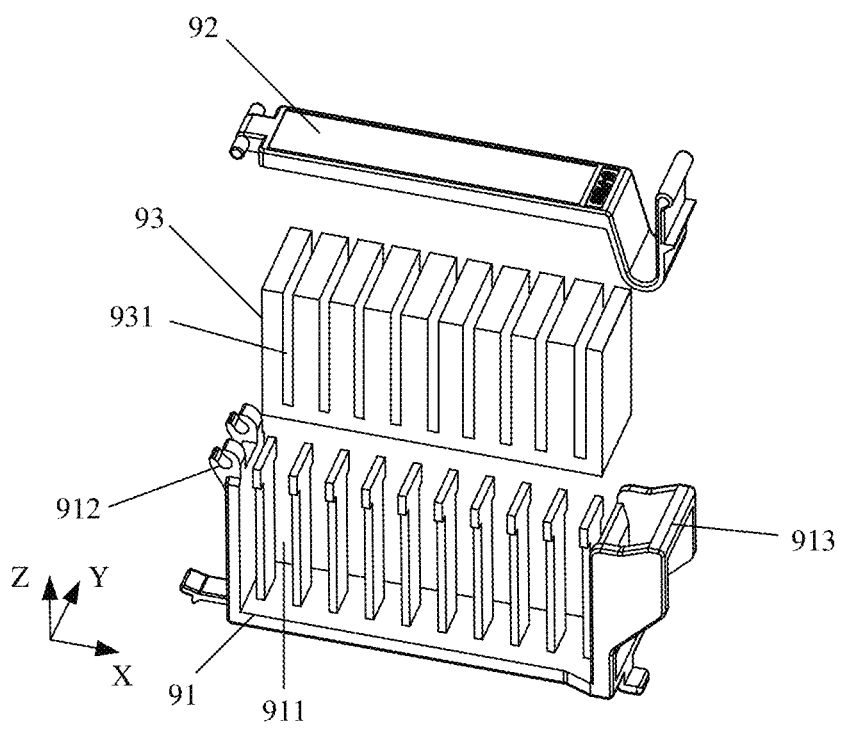
FIG. 19*a* is an exploded view of a second optical fiber fixing structure in a fiber management system according to an embodiment.
Figure 19B:
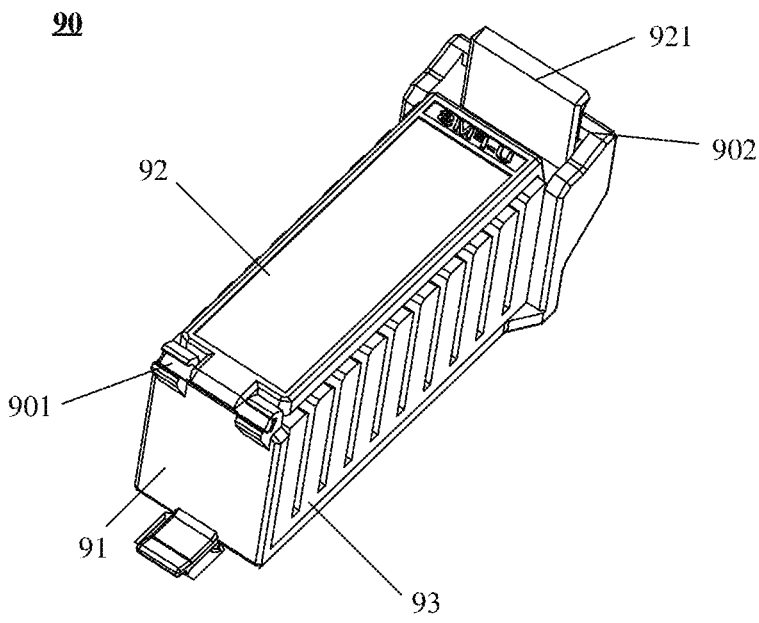
FIG. 19*b* is a schematic diagram of a structure of a second optical fiber fixing structure in a fiber management system according to an embodiment.

For a structure of the second optical fiber fixing structure 90, an exploded view is provided in FIG. 19*a*, and a combined structural view is provided in FIG. 19*b*. The second optical fiber fixing structure 90 includes a fixing base 91, a fixing member 92, and a second elastic fitting member 93. The fixing base 91 is fixed to the rack 20, and a plurality of second optical fiber channels 911 are formed on the fixing base 91 along the X direction, and the second elastic fitting member 93 nests the plurality of second optical fiber channels 911. Second slots 931 for the optical fibers to enter are formed in the second elastic fitting member 93 along the Z direction. Along an arrangement direction of the plurality of second optical fiber channels 911 (for example the X direction), the fixing base 91 is provided with a second fixing position 912 on one side of the plurality of second optical fiber channels 911, and is provided with a second locking position 913 on the other side of the plurality of second optical fiber channels 911. One end of the fixing member 92 is hinged to the second fixing position 912, a second locking portion 921 is formed at the other end of the fixing member 92, and the fixing member 92 is pivotable about a hinge point, so that the second locking portion 921 and the second locking position 913 fit each other to achieve locking or unlocking. In the structure shown in FIG. 19*a*, the second locking position 913 is a protruding column, the second locking portion 921 is an elastic hook, and the elastic hook has a protrusion to hook the protruding column. The second elastic fitting member 93 herein is also made of rubber. Due to good elasticity, when the optical fibers are pressed tightly, the second elastic fitting member 93 can adapt to the optical fibers of different diameters, without causing damage to the optical fibers. A manner in which the fixing base 91 is fixed to the rack 20 is similar to a manner in which the splice tray bracket 30 is fixed to the rack 20. Details are not described herein again.

Figure 20:
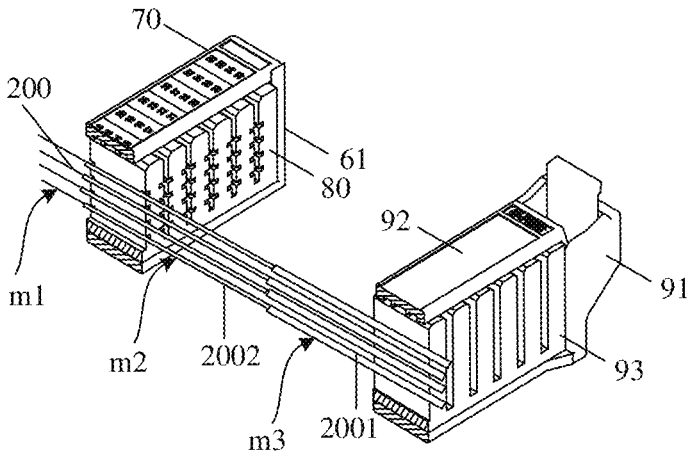
FIG. 20 is a schematic diagram of fixing an optical fiber through a first optical fiber fixing structure and a second optical fiber fixing structure in a fiber management system according to an embodiment.

Refer to a schematic diagram of a fixed structure of the optical fibers 200 shown in FIG. 20. The second optical fiber fixing structure 90 is for fixing optical fiber segments m3 with protective sleeves 2001. The optical fibers 200 cooperatively fixed by the fiber routing structure 61, the first fixing structure 70, and the first elastic fitting member 80 are optical fiber segments m2 without the protective sleeves 2001 but with buffer tube sleeves 2002. Optical fibers in an area of the splice tray bracket 30 are all bare fiber segments m1.

Figure 21:
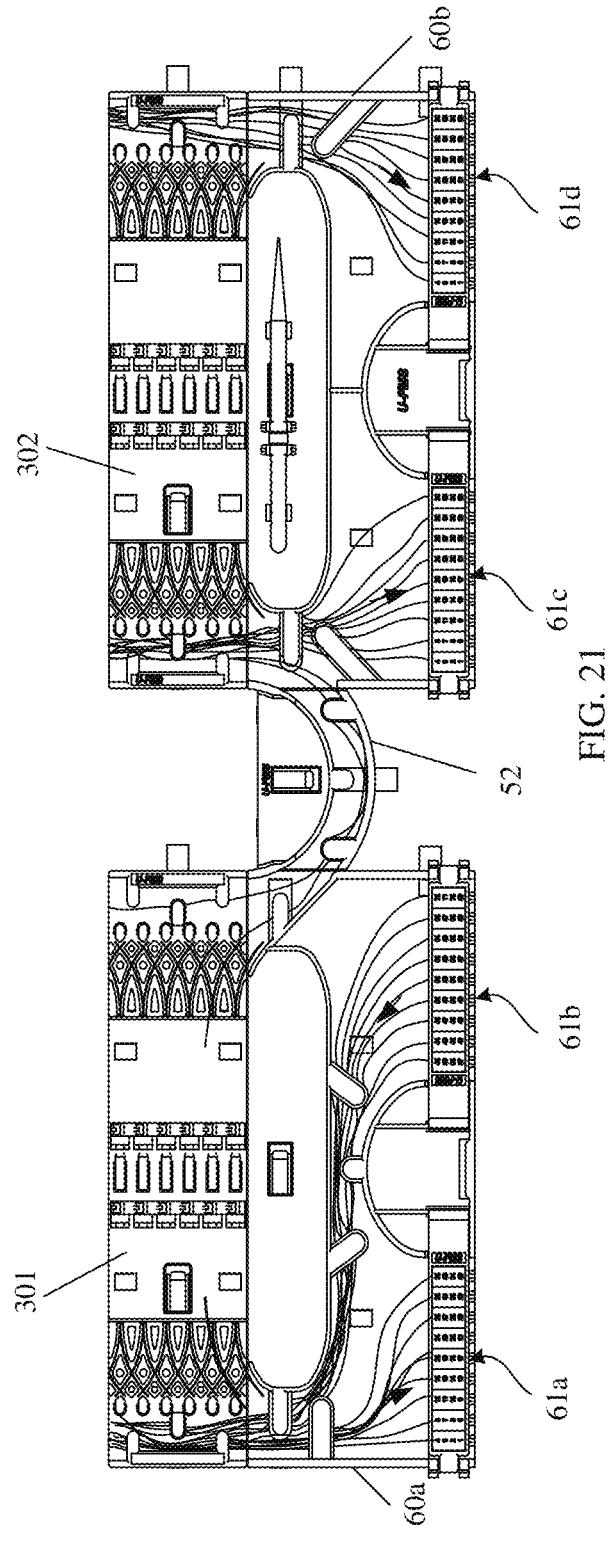
FIG. 21 is a schematic diagram of fiber routing in a fiber management system according to an embodiment.

With reference to a structure of each portion of the fiber management system 100, FIG. 21 shows an example of a fiber routing manner. The fiber management system 100 includes a fiber routing base plate 60*a* corresponding to the first splice tray subunit 301, and a fiber routing base plate 60*b* corresponding to the second splice tray subunit 302. The fiber routing base plate 60*a* includes a fiber routing structure 61*a* and a fiber routing structure 61*b*. The fiber routing base plate 60*b* includes a fiber routing structure 61*c* and a fiber routing structure 61*d*. The fiber routing structures 61*a*, 61*c*, and 61*d* are optical fiber inlets, and the fiber routing structure 61*b* is an optical fiber outlet. In FIG. 21, any routing of the optical fibers in the fiber management system 100 has a large radius. This ensures bending radii of the optical fibers in a limit case. It should be understood that, in applications of the fiber management system 100, there may be other optical fiber routing manners. Because arc-shaped channels or paths are provided in each optical fiber routing area in the fiber management system 100 provided in the embodiments, minimum bending radii of the optical fibers can be ensured, thereby fully protecting the optical fibers.

It should be understood that the fiber management system 100 provided in the embodiments can implement leading-in and fixing, leading-out and fixing, coiling and storage of the optical fibers, matching and mounting of optical splitters with different specifications, and splicing with different volumes in an FDT, and can provide different effects in different application scenarios. In addition, the structure of the fiber management system 100 is relatively independent, and may be integrally used in cooperation with products such as an ODN (optical distribution network) connector box, an ODF (optical distribution frame) subrack, and an FAT (fiber access terminal).

The foregoing descriptions are merely implementations of the embodiments, but are not intended as limiting. Any variation or replacement readily figured out by a person skilled in the art shall fall within the scope of the embodiments.

What is claimed is:

1. A splice tray, comprising:
   a base tray including an optical splitting area, a splice area, and a coiling storage area that are formed in the base tray, the splice area is configured for optical fiber splicing, and the coiling storage area is configured for optical fiber coiling storage; and
   a mounting port for mounting an optical splitter is provided in the optical splitting area, the mounting port has a first inner wall and a second inner wall facing each other, a support structure connected to the base tray is disposed between the first inner wall and the second inner wall, a weak portion is formed at a junction between the support structure and the base tray, and the weak portion configured to selectively break or deform the support structure to adjust a size of the mounting port along a direction from the first inner wall to the second inner wall, to fit the optical splitter.

2. The splice tray according to claim 1, wherein, along the direction from the first inner wall to the second inner wall, the support structure comprises a plurality of support plates sequentially connected, and a weak portion is formed at a junction between adjacent support plates.

3. The splice tray according to claim 1, wherein the splice area is provided with a splicing module, and the splicing module comprises a plurality of splicing grooves arranged in a linear array.

4. The splice tray according to claim 1, wherein the coiling storage area is provided with a coiling storage module, and an arc surface for coiling optical fibers is formed in the coiling storage module.

5. A fiber management system, comprising:

a splice tray bracket, and a plurality of splice trays according to claim 1, wherein the splice tray bracket is provided with a plurality of mounting workstations in a one-to-one correspondence with the splice trays; and the splice trays are hinged to the corresponding mounting workstations through hinge shafts, and shaft axes of the hinge shafts are parallel to a width direction of the splice tray bracket.

6. The fiber management system according to claim 5, wherein, along the width direction of the splice tray bracket, the splice tray bracket has a first splice tray area and a second splice tray area; a first fiber routing bridge and a second fiber routing bridge are provided between the first splice tray area and the second splice tray area; and the first fiber routing bridge is configured for routing optical fibers from the first splice tray area to the second splice tray area, and the second fiber routing bridge is configured for routing optical fibers from the second splice tray area to the first splice tray area.

7. The fiber management system according to claim 6, wherein the first fiber routing bridge forms an arc-shaped first fiber routing channel, and the second fiber routing bridge forms an arc-shaped second fiber routing channel;

along the width direction of the splice tray bracket, a plurality of first fiber routing paths are respectively formed on two sides of mounting workstations in the first splice tray area, and each first fiber routing path is arc-shaped; and a plurality of second fiber routing paths are respectively formed on two sides of mounting workstations in the second splice tray area, and each second fiber routing path is arc-shaped.

8. The fiber management system according to claim 7, wherein a connection portion between the first fiber routing path and the first fiber routing channel is arc-shaped, and a connection portion between the first fiber routing path and the second fiber routing channel is arc-shaped; and a connection portion between the second fiber routing path and the first fiber routing channel is arc-shaped, and a connection portion between the second fiber routing path and the second fiber routing channel is arc-shaped.

9. The fiber management system according to claim 5, further comprising a plurality of fiber routing structures and a plurality of first optical fiber fixing structures, wherein the fiber routing structures are in a one-to-one correspondence with the first optical fiber fixing structures;

along the width direction of the splice tray bracket, each fiber routing structure forms a plurality of first optical fiber channels to lead optical fibers into the splice tray bracket or to lead optical fibers out from the splice tray bracket; and a first elastic fitting member is disposed between each group of the fiber routing structure and the first optical fiber fixing structure that correspond to each other, and the first elastic fitting member nests the first optical fiber channel to adapt to the optical fiber.

10. The fiber management system according to claim 9, wherein, in a group of the first optical fiber fixing structure and the fiber routing structure that correspond to each other:

along an arrangement direction of the plurality of first optical fiber channels, a first fixing position is provided on one side of the fiber routing structure, and a first locking position is provided on the other side of the fiber routing structure; and one end of the first optical fiber fixing structure is hinged to the first fixing position, a first locking portion is formed at the other end of the first optical fiber fixing structure, and the first optical fiber fixing structure is pivotable about a hinge point so that the first locking portion and the first locking position fit each other to achieve locking or unlocking.

11. The fiber management system according to claim 10, further comprising a plurality of second optical fiber fixing structures in a one-to-one correspondence with the fiber routing structures, wherein each second optical fiber fixing structure comprises a fixing base, a fixing member, and a second elastic fitting member;

the fixing base is fixed to a rack, a plurality of second optical fiber channels are formed on the fixing base, and the second elastic fitting member nests the plurality of second optical fiber channels; along an arrangement direction of the plurality of second optical fiber channels, the fixing base is provided with a second fixing position on one side of the plurality of second optical fiber channels, and is provided with a second locking position on the other side of the plurality of second optical fiber channels; and one end of the fixing member is hinged to the second fixing position, a second locking portion is formed at the other end of the fixing member, and the fixing member is pivotable about the hinge point so that the second locking portion and the second locking position fit each other to achieve locking or unlocking.

12. The fiber management system according to claim 11, wherein the first locking position is a protruding column, the first locking portion is an elastic hook, and the elastic hook has a protrusion to hook the protruding column.

13. The fiber management system according to claim 11, wherein the second locking position is a protruding column, the second locking portion is an elastic hook, and the elastic hook has a protrusion to hook the protruding column.

* * * * *